United States Patent [19]

Kühnlein et al.

[11] 4,357,206

[45] Nov. 2, 1982

[54] PROCESS AND APPARATUS FOR THE CONCENTRATION OF AN ALKALINE SOLUTION

[75] Inventors: Hans Kühnlein, Füllinsdorf; Hans R. Küng, Frenkendorf; Georg Molnar, Füllinsdorf, all of Switzerland

[73] Assignee: Bertrams AG, Basel, Switzerland

[21] Appl. No.: 277,683

[22] Filed: Jun. 26, 1981

[30] Foreign Application Priority Data

Jul. 11, 1980 [CH] Switzerland .................. 5326/80

[51] Int. Cl.³ .......................... B01D 1/10; B01D 1/22
[52] U.S. Cl. .................................... 159/13 A; 159/49
[58] Field of Search ............ 165/146, 147; 159/13 A, 159/5, 13 R, 49

[56] References Cited

U.S. PATENT DOCUMENTS 2,545,028  3/1951  Haldeman .................. 159/13 A

FOREIGN PATENT DOCUMENTS 281743  3/1952  Switzerland .

Primary Examiner—Frank Sever
Attorney, Agent, or Firm—Birch, Stewart, Kolasch and Birch

[57] ABSTRACT

An alkaline solution film flowing from the top toward the bottom in falling-film evaporator tubes (1) is heated by a heat-transfer fluid flowing from the bottom toward the top in a narrow heating jacket (5). Since large temperature differences occur between the heat-transfer fluid and the alkaline solution film in the upper heated portion of the evaporator tube (1), in contrast to the lower portion, especially at high flow rate as it occurs in a narrow heating jacket (5), the heat flow density can at that location lead to a lack of wetting of the evaporator tube. To avoid such critical heat flow densities, the upper section (5a) of the heating jacket (5) is conically widened and thus the flow rate in this section is reduced to such an extent that a critical heat flow density is not reached at that point.

7 Claims, 2 Drawing Figures

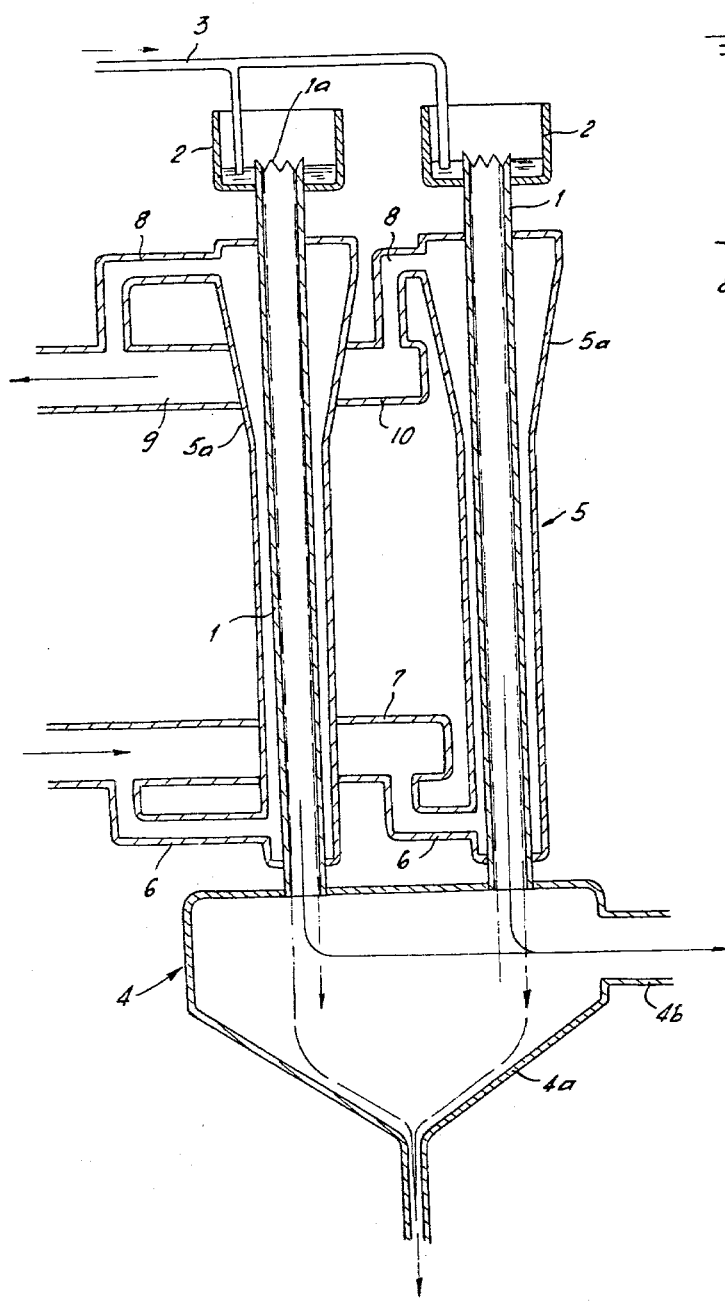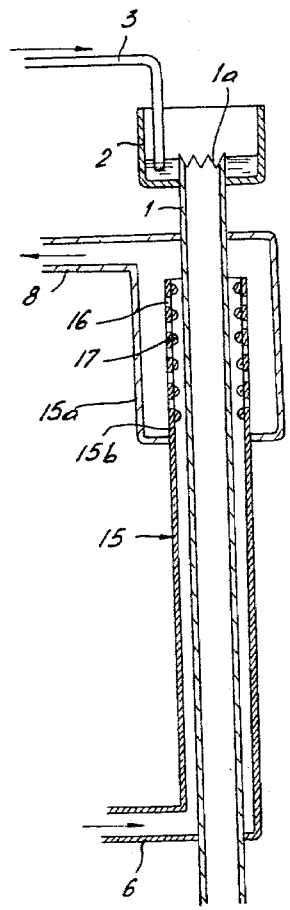
Fig. 1
Fig. 2

PROCESS AND APPARATUS FOR THE CONCENTRATION OF AN ALKALINE SOLUTION

BACKGROUND AND SUMMARY OF THE INVENTION

The present invention relates to a process for the concentration of an alkaline solution wherein an alkaline film falling downwardly along the inside of at least one evaporator tube is heated by a heat-transfer fluid conveyed upwardly along the outside of the tube.

Relatively high temperatures are required for the concentration of alkaline solutions which usually are obtained as a 50% solution and are to be concentrated to practically an anhydrous melt. Therefore, a salt melt has proven to be suitable as the heat-transfer fluid, which melt is fed at, for example, about 450° C. to the lower portion of the heating jacket surrounding the evaporator tube and makes it possible at this location to reach, with a boiling temperature of the alkaline solution of 430° C., a concentration of about 99%. If the alkaline solution which has a strength of, for example, 50% is fed at a temperature of about 140° C. to the upper portion of the evaporator and the salt melt is discharged at that location from the heating jacket at a temperature, for example, of about 380° C., a temperature difference of, for example, 20° C. prevails between the boiling liquid and the salt melt in the lower portion of the falling-film evaporator tube, whereas a temperature difference of 240° C. exists in the upper portion of the evaporator tube. This large temperature difference between the heat-transfer fluid and the boiling alkaline solution in the upper portion of the tube leads to a very high heat flow density (heat flux) and as a result, a complete lack of wetting of the evaporator surface takes place at certain spots. This is a well-known phenomenon (known as the Leidenfrost effect) if the heat flow density exceeds a certain magnitude on evaporator surfaces.

Under the above-described operating condition, a heat flow density of more than 250,000 kcal/hm² evolves, and under these circumstances it is unavoidable for the evaporator surface to "run dry" at spots.

It is known that evaporator tubes made of pure nickel or high-nickel alloys have proven to be rather highly corrosion-resistant when used for the concentration of alkaline solutions to practically anhydrous melts. However, the prerequisite for this effect is that an uninterrupted nickel oxide film is formed on all surfaces exposed to the solution. It has been found that this is the case in a falling-film evaporator tube as long as the liquid film uniformly covers the evaporator surface. However, the aforementioned high heat flow densities which thus are critical regarding the lack of wetting of the evaporator surface, however, lead not only to a destruction of the nickel oxide film, but at the same time result in intermittent thermal stresses in the evaporator tube wall. These factors, in combination, can lead to a rapid destruction of the evaporator tubes.

Accordingly, it is an object of the present invention to provide a process of the aforementioned type and an apparatus for conducting said process wherein the above-described disadvantages are eliminated. The process of the present invention is characterized in that, in order to avoid critical heat flow densities on the evaporator surface, the flow rate of the heat-transfer fluid is reduced in the upper heating section of the heating jacket when compared to the sections lying in the lower portion thereof. This is achieved by providing a heat exchange apparatus wherein the heating jacket which coaxially surrounds the cylindrical evaporator tube is radially widened in its upper section leading to the fluid outlet. The flaring (enlarging) of the heating jacket section can be conical or cylindrical or otherwise. It is also possible to provide several cylindrical sections which increasingly widen in the upward direction, or to provide a cylindrical section which adjoins a conical portion. In any event, the flaring feature leads to a reduction of the flow rate of the heat-transfer fluid, so that it is readily possible by a suitable selection of the size of the flaring section to maintain a flow rate in the upper zone, which has a high temperature difference between the heat-transfer fluid and the alkaline solution, at such a low value that, with a correspondingly reduced heat-transfer coefficient, a subcritical heat flow density can be achieved. Thus a heat flow density can be obtained which does not lead to a lack of wetting. This advantageous result can be provided without undesirably affecting the conditions in the lower region of the heat-exchange system which has only minor temperature differences.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 shows a first embodiment of a concentrating device according to the present invention in an axial sectional view and FIG. 2 shows a portion of a second embodiment, in an analogous sectional view.

DETAILED DESCRIPTION OF THE INVENTION

In the embodiment of FIG. 1, two falling-film evaporator tubes 1 are provided, which project with their serrated upper rim 1a, serving as an overflow edge into a distributor 2. The distributors 2 are connected to an alkaline solution feed line 3 which is common to all distributors. It can be readily understood that the apparatus could also comprise only a single evaporator tube, or could include more than two evaporator tubes 1. The bottom of the evaporator tubes 1 are in communication with a collecting chamber 4 which is common to all tubes. The collecting chamber is equipped with an outlet funnel 4a for the concentrated alkaline melt and with a vapor outlet 4b.

Each of the two cylindrical evaporator tubes 1 is encompassed by a coaxially disposed heating jacket 5. At the bottom the heating jackets 5 are connected via connecting pipes 6 to a feed line 7 common to all pipes and serving as the conduit for circulating the heat-transfer fluid which is heated by a heating device not shown. The heating jackets are connected at the top via connecting pipes 8 with a common reflux conduit 9. The upper section 5a of each heating jacket 5 is conically widened or flared with respect to the relatively narrow, cylindrical main portion of the heating jacket. By flaring the upper portion 5a of the heating jacket 5 in the upper section, the flow rate of the heat-transfer fluid is increasingly lowered. Thus, according to the known rules of heat transfer of flowing liquids to a wall, the heat-transfer coefficient is likewise correspondingly reduced toward the top as a result which finally culminates in a reduced heat flow density or in a "subcritical" heat flow density in spite of an upwardly increasing temperature difference.

It is thus possible to select the dimensions of the heat-transfer jacket 5 in dependence on the quantity of flowing heat-transfer medium in such a way that there is no place where an unduly high heat flow density occurs. This is of economical importance inasmuch as very expensive materials must be employed for the construction of alkaline solution concentrators. It is therefore of paramount importance to be able to transfer a maximum amount of heat, as seen in total, per square meter of heated surface, on the average, and at the same time to ensure a long lifetime.

The aforedescribed apparatus makes it possible to attain these objectives, in that in the lower section of the evaporator tubes 1, where there is a small temperature difference between the boiling alkaline solution and the heat-transfer fluid, a rather high evaporator efficiency can yet be attained by maintaining the gap between the evaporator tube 1 and the heating jacket 5 so narrow that a high heat-transfer agent flow rate and a correspondingly high heat-transfer coefficient exist at that location. This will be further explained using the following example which is exemplary of the present invention and accordingly should not be considered as limiting in any way the scope of the present invention.

The evaporator tube 1 has an external diameter of 112 mm and the heating jacket 5 has an internal diameter of 127 mm, which is flared to 200 mm in the upper section 5a. With a circulating amount of heat-transfer fluid of, for example, 10 m$^3$/h, a rate of 8 m/sec is thus obtained in the lower portion of the heating jacket 5, and a minimum flow rate of 1.3 m/sec is obtained in the upper portion 5a. Taking the respective temperature differences into account which exist between the boiling liquid and the heat-transfer medium, an average heat flow density of 40,000 kcal/hm$^2$ results in the lower and medium portions of the heating jacket 5, and in the upper portion 5a an average heat flow density prevails of 35,000 kcal/hm$^2$. According to observations, there is no danger of dry spots during the concentration of the alkaline solution at these values.

Various other possibilities exist for attaining the aforedescribed effect. However, these possibilities are based on the aspect of suitably adapting the flow rates of the heat-transfer medium by varying the flow-through cross section in the heat-transfer jacket and thus affecting the desired heat flow density.

Another refined technique for attaining the same goal resides in not only reducing the flow rate of the heat-transfer medium in a controlled fashion, but also simultaneously decreasing the quantity of heat-transfer medium participating in the heat transfer. This provides the possibility of reducing the heat transition not only by reducing the heat-transfer coefficient, but additionally by decreasing the temperature difference between the boiling alkaline solution and the heat-transfer fluid. This can be accomplished by providing that the heat-transfer fluid is cooled off more rapidly along its flow path on the evaporator tube in the upper section, for example by a feature wherein it is no longer the entire amount of heat-transfer medium which participates in the heat-transfer process in this section.

FIG. 2 shows such an apparatus (for the sake of simplicity, only one evaporator tube 1 is illustrated). The cylindrical evaporator tube 1, projecting with its upper serrated rim 1a into the distributor 2, analogous to the first embodiment, is surrounded by a coaxially disposed heating jacket 15. The distributor 2 is connected to the feed line 3 for the alkaline solution. The upper end portion 15b of this cylindrical, relatively narrow heating jacket 15 is perforated as indicated at 16 and encompassed by a radially flaring, cylindrical jacket section 15a, which could also have another shape, e.g., conical. This jacket section 15a projects past the perforated end section 15b and is connected at that point to the connecting pipe 8 leading to the reflux line for the heat-transfer fluid. The perforated end section 15b of the heating jacket 15 is constructed on the inside with projections, so-called nubs 17, uniformly distributed over the internal periphery thereof. These nubs act in the gap between the end section 15b of the jacket and the evaporator tube 1 as flow resistance elements and ensure a uniform distribution of the heat-transfer fluid all around the evaporator tube 1.

The heat-transfer fluid flows via the connecting pipe 6 into the cylindrical heat-transfer jacket 15; through the openings 16 present in its upper portion. A part of the heat-transfer fluid passes successively into the flaring jacket section 15a while only a small portion of the heat-transfer fluid will now pass directly along the evaporator tube 1. In the end section 15b, the two streams are reunited and are discharged from the apparatus via the connecting pipe 8. The flaring zone in section 15a here again effects a marked reduction in the flowthrough rate, whereas the perforated end portion 15b acts a a partition which correspondingly reduces the quantity of heat-transfer fluid participating in the heat transfer to the evaporator tube 1. Attributable to the nubs 17, however, a uniform distribution of the heat-transfer fluid over the pipe circumference is maintained, resulting in a correspondingly uniform flow of heat-transfer medium and the avoidance of tube deformation or damage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for concentrating an alkaline solution which comprises:
   at least one evaporator tube,
   means for introducing the alkaline solution to be concentrated into the upper portion of said evaporator tube so that a film of said alkaline solution falls along the internal surface of said evaporator tube,
   a collecting chamber communicating with the lower portion of said evaporator tube for recovering the concentrated alkaline solution,
   heat exchange jacket means surrounding and spaced apart from said evaporator tube along its substantial length, said jacket means and evaporator tube defining an annular channel therebetween for receiving a heat-exchange fluid, said annular channel being sized and dimensioned at the upper portion of the evaporator tube for reducing the flow rate of the heat exchange fluid to such an extent that a critical heat flow density is not reached and sufficient to avoid the Leidenfrost effect, and means for introducing the heat exchange fluid into the lower portion of said heating jacket and means for removing the heat exchange fluid from the enlarged upper portion of said heat jacket.

2. The apparatus of claim 1 wherein the heat exchange jacket is enlarged cylindrically or conically to form said annular channel.

3. The apparatus of claims 1 and 2 wherein the heat exchange jacket having the same dimensions as in the lower portion thereof extends into the enlarged annular channel and aperture are provided in said extended portion to permit egress of said heat exchange fluid through said extended portion into said enlarged annular channel.

4. The apparatus of claim 3 wherein the inner surface of the perforated jacket is uniformly provided with a plurality of nubs for ensuring a uniform distribution of the heat-transfer fluid around the evaporator tube.

5. The apparatus of claim 1 wherein the means for introducing the alkaline solution to be concentrated comprises a distributor container and conduit means for introducing said alkaline solution into said distributor container, the upper end portion of said evaporator tube extending above the bottom of said distributor container whereby the alkaline solution introduced thereinto is permitted to fall as a film over the end portion of said evaporator tube.

6. The apparatus of claim 5 wherein the top of the evaporator tube is serrated.

7. The apparatus of claim 1 wherein the collecting chamber is provided with a liquid outlet and a vapor outlet.

* * * * *